(12) United States Patent
Kim et al.

(10) Patent No.: US 10,910,864 B2
(45) Date of Patent: Feb. 2, 2021

(54) WIRELESS POWER TRANSMITTING DEVICE AND METHOD

(71) Applicant: Electronics and Telecommunications Research Institute, Daejeon (KR)

(72) Inventors: Sang-Won Kim, Daejeon (KR); Jung Ick Moon, Daejeon (KR); Seong-Min Kim, Daejeon (KR); In Kui Cho, Daejeon (KR); Je Hoon Yun, Daejeon (KR); Dong Won Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 394 days.

(21) Appl. No.: 15/909,302

(22) Filed: Mar. 1, 2018

(65) Prior Publication Data
US 2019/0058349 A1    Feb. 21, 2019

(30) Foreign Application Priority Data
Aug. 21, 2017    (KR) .................. 10-2017-0105743

(51) Int. Cl.
| | |
|---|---|
| *H02J 7/02* | (2016.01) |
| *H02J 50/10* | (2016.01) |
| *H01M 10/44* | (2006.01) |
| *H01F 27/38* | (2006.01) |
| *H02J 50/12* | (2016.01) |
| *H01F 38/14* | (2006.01) |
| *H01F 27/28* | (2006.01) |

(52) U.S. Cl.
CPC .......... *H02J 7/025* (2013.01); *H01F 27/2823* (2013.01); *H01F 27/38* (2013.01); *H01F 38/14* (2013.01); *H01M 10/44* (2013.01); *H02J 50/10* (2016.02); *H02J 50/12* (2016.02)

(58) Field of Classification Search
CPC ........................................................ H02J 7/025
USPC ....................................................... 320/108
See application file for complete search history.

(56) References Cited

U.S. PATENT DOCUMENTS

| | | | |
|---|---|---|---|
| 8,400,248 B2 | 3/2013 | Kim et al. | |
| 2012/0019075 A1 | 1/2012 | Cho et al. | |
| 2014/0084703 A1* | 3/2014 | Hall ....................... | B60L 53/665 307/104 |
| 2014/0091756 A1* | 4/2014 | Ofstein ................... | H01F 38/14 320/108 |
| 2014/0354222 A1* | 12/2014 | Park ........................ | H02J 50/70 320/108 |

(Continued)

FOREIGN PATENT DOCUMENTS

| | | |
|---|---|---|
| KR | 10-2016-0124568 A | 10/2016 |
| KR | 10-2017-0072761 A | 6/2017 |

(Continued)

*Primary Examiner* — Jerry D Robbins
(74) *Attorney, Agent, or Firm* — NSIP Law

(57) ABSTRACT

Disclosed is a wireless power transmitting device and method, the wireless power transmitting device including, in response to detection of a power receiver within a predetermined separation distance from a charging pad, a controller configured to generate a magnetic field through a transmission coil with a multilayer structure in which a plurality of coil layers of different sizes are stacked, and a power transmitter configured to wirelessly transmit, to a reception coil of the power receiver, a power signal generated using magnetic fields generated by the plurality of coil layers.

17 Claims, 18 Drawing Sheets

(56) References Cited

U.S. PATENT DOCUMENTS

2016/0181854 A1* 6/2016 Leabman ................ H02J 50/60
                                                    320/108
2016/0257209 A1* 9/2016 Lewis ..................... B60L 53/12

FOREIGN PATENT DOCUMENTS

KR    10-2017-0074146 A     6/2017
WO    WO 2018/194223 A1    10/2018

* cited by examiner

FIG. 8

|  |  | L(uH) | C(nF) | Q | r(mΩ) | Coil size | Number of turns | Height |
|---|---|---|---|---|---|---|---|---|
| Tx coil | 710 | 14.918 | 117.9 | 268.1 | 14.918 | D=260mm | 4turns | 10mm |
| | 720 | 16.971 | 103.65 | 326.5 | 38.93 | D_primary =260mm | 3turns | 10mm |
| | | | | | | D_secondary =230mm | 2turns | 10mm |
| | 730 | 17.019 | 103.38 | 332.2 | 38.81 | D_primary =260mm | 3turns | 10mm |
| | | | | | | D_secondary =230mm | 2turns | 10mm |
| Rx coil | 910 | 39.246 | 32.93 | 138.6 | 250.4 | 120×105mm | 12turns | 3mm |

3-layer, 12-turn

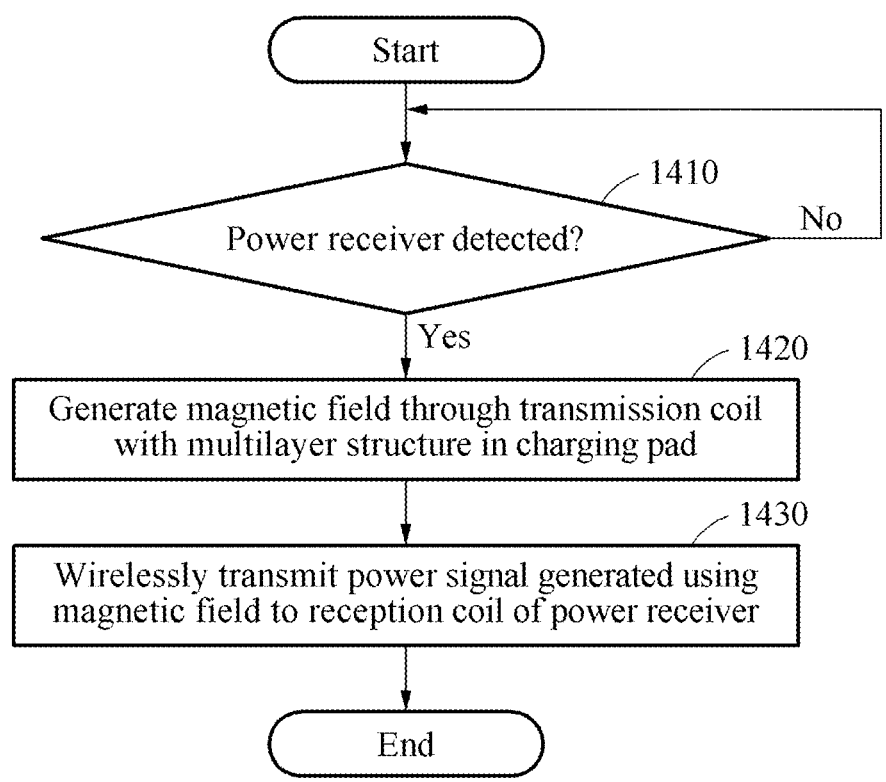

WIRELESS POWER TRANSMITTING DEVICE AND METHOD

CROSS-REFERENCE TO RELATED APPLICATION(S)

This application claims the priority benefit of Korean Patent Application No. 10-2017-0105743 filed on Aug. 21, 2017, in the Korean Intellectual Property Office, the disclosure of which is incorporated herein by reference for all purposes.

BACKGROUND

1. Field

One or more example embodiments relate to wireless power (energy) transmission technology, and more particularly, to a wireless power transmitting device and method that may maintain a uniform charging efficiency in the entire area while expanding a wireless power coverage by improving a structure of a transmission coil included in a charging pad to generate a magnetic field.

2. Description of Related Art

With the recent wide propagation of mobile devices such as drones to general users, the use of multimedia and real-time videos by users of portable terminals is explosively increasing. However, the devices include batteries of limited capacities and thus, wired charging of the batteries are needed frequently.

In particular, a drone may have a relatively short flight time of about 30 minutes. A user may experience inconvenience in separating a battery and connecting a cable thereto for charging. Thus, to alleviate the inconvenience of wired charging, various wireless charging technologies are being developed.

Meanwhile, in a case of a mobile device such as a drone, an error may occur in a landing point when the mobile device moves to a charging pad for charging. Thus, the charging pad needs to be manufactured in a great size. In addition, when the charging pad has a relatively great area, multiple smart devices may be charged simultaneously irrespective of charging positions.

However, when a transmission coil in a greater size than a reception coil of a power receiver is used in a charging pad to expand a wireless charging coverage, a charging efficiency may change based on a position of the reception coil with respect to the transmission coil although the two coils are at a predetermined distance. In particular, when the reception coil of the power receiver is positioned close to a central portion of the transmission coil of the charging pad, an insufficient rectified voltage may be generated such that the power receiver may not be charged.

Further, when the wireless charging coverage is expanded to dispose multiple transmission coils on a plane in the charging pad, an unnecessary standby current may be consumed to simultaneously supply power to all transmission coils for charging, which may result in a decrease in a charging efficiency. In this example, to detect a portion of the transmission coils aligned with a reception coil of a power receiver and supply power only to the detected portion, a separate control circuit and a separate algorithm may be needed, which may lead to an increase in the implementation complexity and an increase in the product price.

FIG. 1 illustrates a wireless power transmitting device according to a related art, and FIG. 2 illustrates a transmission coil in a wireless power transmitting device according to a related art.

Referring to FIGS. 1 and 2, a wireless power transmitting device according to a related art may supply power to a drone 110 by generating magnetic fields 203 and 204 through a transmission coil 200 disposed in a charging pad 100, when the drone 110 with a battery discharged while performing a task lands on the charging pad 100.

The drone 110 may be controlled automatically or manually to land on the charging pad 100. In this example, an error may occur in a landing point. In general, the transmission coil 200 in the charging pad 100 may be designed in a relatively great size, when compared to a reception coil 201 or 202 disposed in the drone 110. Thus, a charging efficiency may change based on the landing point of the drone 110.

When the transmission coil 200 has a greater size than the reception coil 201 or 202, an intensity of the magnetic field 203 may decrease toward a core of the transmission coil 200. The intensity of the magnetic field 204 generated near a boundary surface of the transmission coil 200 may be greater than the intensity of the magnetic field 203 generated in a central area of the transmission coil 200.

That is, based on a position of the reception coil 201 or 202 in the drone 110, a charging efficiency and a rated voltage may be maximized near the boundary surface of the transmission coil 200. However, the charging efficiency and the rated voltage may gradually decrease toward the central area of the transmission coil 200, or charging may be impossible in the central area of the transmission coil 200.

As described above, in a wireless power transmitting device using an existing transmission coil, the distribution of charging efficiency may be non-uniform, and particularly, the charging efficiency may decrease greatly in a central area of the transmission coil. In a case of supplying power by controlling multiple small transmission coils through a separate control circuit, implementation thereof may be complex.

Accordingly, there is a demand for technology that may maintain a uniform charging efficiency irrespective of a position of a reception coil with respect to a transmission coil and enable charging in the entire area of the transmission coil, using a relatively great transmission coil when compared to the reception coil, by simply changing a structure of the transmission coil, without performing a separate circuit change or control.

SUMMARY

An aspect suggests a new structure of a transmission coil that may expand a wireless charging coverage and maintain a uniform charging efficiency in a wireless power (energy) transmitting device.

Another aspect also provides a wireless power transmitting device that may enhance a magnetic field that decreases in a central area of a transmission coil in a charging pad by improving a structure of the transmission coil to a multilayer structure in which a plurality of coil layers are stacked in a tapered form, thereby expanding a wireless charging coverage on the charging pad and maintaining a uniform charging efficiency in the entire area of the transmission coil irrespective of a charging position.

Still another aspect also provides a wireless power (energy) transmitting device that may wirelessly charge a power receiver with a uniform charging efficiency at any position of a reception coil of the power receiver on a transmission coil in a charging pad while expanding a wireless charging coverage by setting an area of the transmission coil to be relatively great when compared to an area of the reception coil.

Yet another aspect also provides a wireless power transmitting device that may wirelessly charge mobile devices of various sizes and expand a wireless charging coverage by adjusting a diameter of a primary transmission coil being wound to form a first coil layer (the uppermost layer) in a transmission coil with a multilayer structure based on a maximum area of a charging pad.

Further another aspect also provides a wireless power transmitting device that may enhance an intensity of a magnetic field in a central area of a transmission coil by stacking a secondary coil having a lesser diameter than a primary transmission coil on a second coil layer under the primary transmission coil, and stacking a tertiary transmission coil having a lesser diameter than the secondary coil under the secondary coil.

Still another aspect also provides a wireless power transmitting device that may have a uniform magnetic field density in the entire area of a transmission coil by enhancing an intensity of a magnetic field in a central area of the transmission coil using a magnetic substance such as ferrite core disposed at a core of the transmission coil.

According to an aspect, there is provided a wireless power transmitting device including, in response to detection of a power receiver within a predetermined separation distance from a charging pad, a controller configured to generate a magnetic field through a transmission coil with a multilayer structure in which a plurality of coil layers of different sizes are stacked, and a power transmitter configured to wirelessly transmit, to a reception coil of the power receiver, a power signal generated using magnetic fields generated by the plurality of coil layers.

According to another aspect, there is also provided a wireless power transmitting method including, in response to detection of a power receiver within a predetermined separation distance from a charging pad, generating a magnetic field through a transmission coil with a multilayer structure in which a plurality of coil layers of different sizes are stacked, and wirelessly transmitting, to a reception coil of the power receiver, a power signal generated using magnetic fields generated by the plurality of coil layers.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is a table illustrating an example of design specifications of transmission coils used in wireless power transmitting devices according to an example embodiment;

FIG. 14 is a flowchart illustrating a wireless power transmitting method according to an example embodiment.

DETAILED DESCRIPTION

Figure 1:
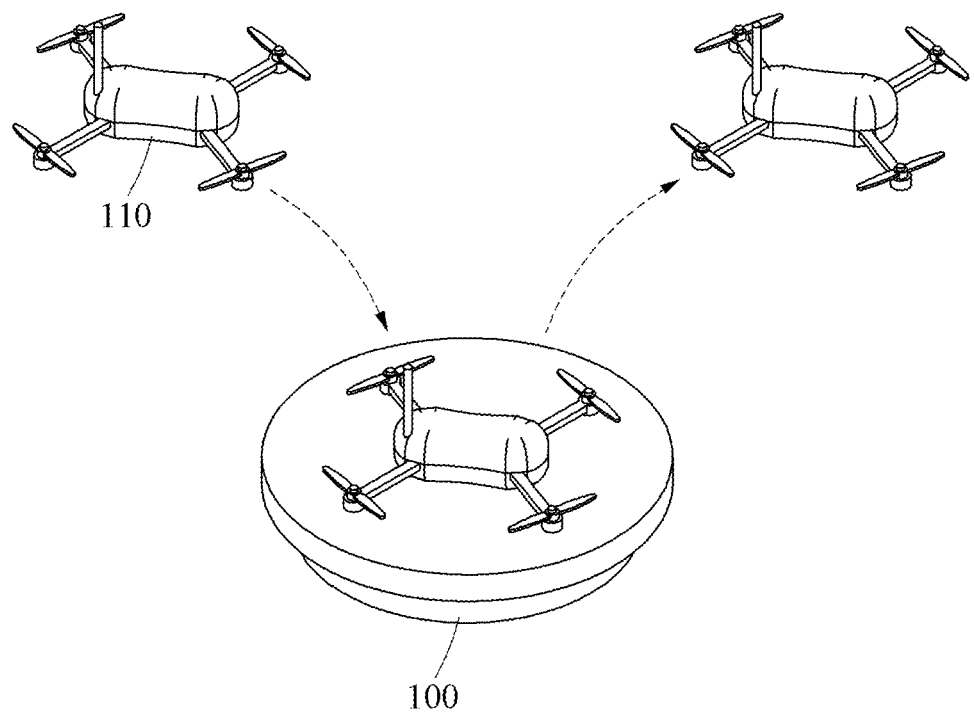
FIG. 1 illustrates a wireless power transmitting device according to a related art.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 3:
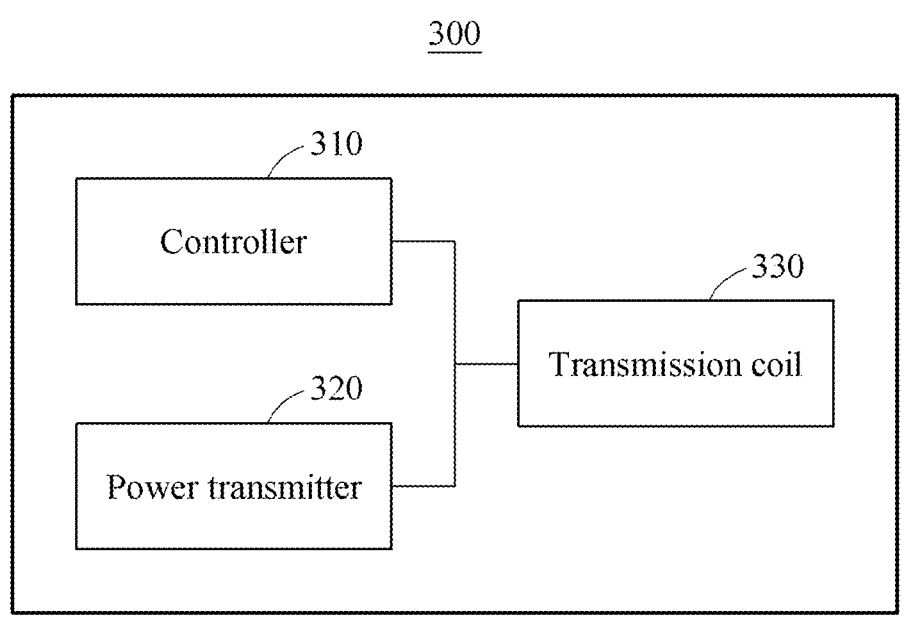
FIG. 3 is a block diagram illustrating a configuration of a wireless power transmitting device according to an example embodiment.

FIG. 3 is a block diagram illustrating a configuration of a wireless power transmitting device according to an example embodiment.

Referring to FIG. 3, a wireless power transmitting device 300 may include a controller 310, a power transmitter 320, and a transmission coil 330.

The controller 310 may generate a magnetic field through the transmission coil 330 with a multilayer structure in a charging pad, in response to detection of a power receiver within a predetermined separation distance from the charging pad.

Figure 5:
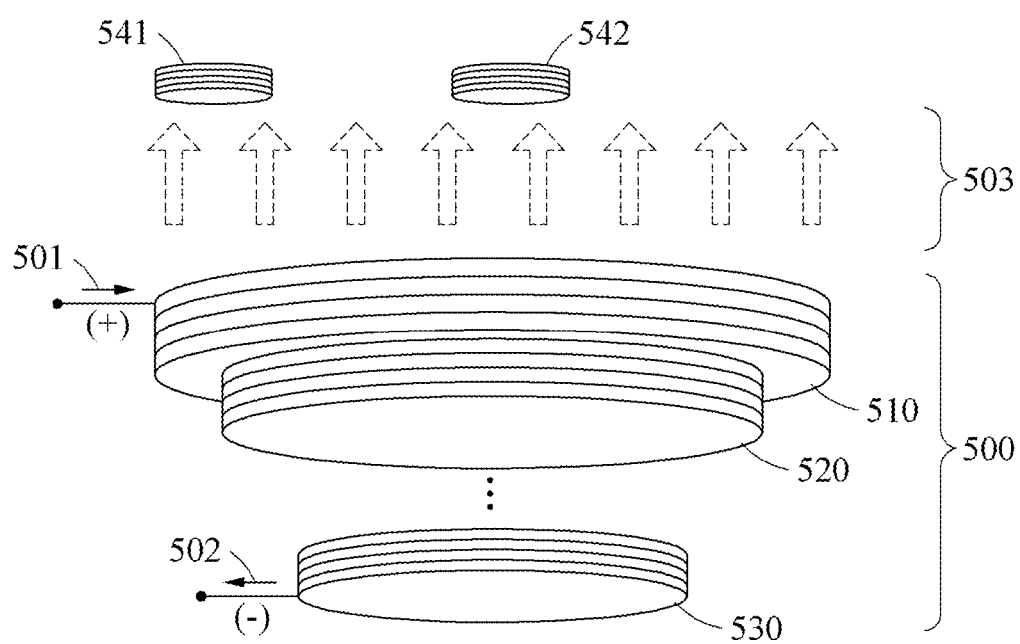
FIG. 5 illustrates a structure of a transmission coil included in a charging pad in a wireless power transmitting device according to an example embodiment.

For example, referring to FIG. 5, the controller 310 may generate a magnetic field 503 through each of a plurality of coil layers 510, 520 and 530 in the transmission coil 330, 500, in response to detection of a reception coil 541 or 542 disposed on a rear side of a power receiver on a horizontal plane, for example, 5 millimeters (mm) spaced apart from the first coil layer 510 which is an uppermost layer of the transmission coil 330, 500 with the multilayer structure constituting the charging pad.

Further, in response to reception of a power transmission request including required power from the power receiver positioned at a predetermined location within the predetermined separation distance (for example, "5 mm") from the charging pad, the controller 310 may generate the magnetic field when the reception coil of the power receiver and the transmission coil are in parallel while maintaining the predetermined separation distance for a predetermined time.

That is, the controller 310 may transmit a power signal to the reception coil through the power transmitter 320, which will be described later, by generating the magnetic field when the reception coil of the power receiver is in parallel with the transmission coil in the charging pad within the predetermined distance (for example, "5 mm"), although the transmission coil and the reception coil are not exactly aligned.

For example, referring to FIG. 5, the controller 310 may apply, to the transmission coil 330, 500, a single inverter voltage corresponding to the power required by the power receiver, and generate, in the entire area of the transmission coil 300, 500, the uniform magnetic field 503 within a predetermined intensity range at a feeder cable included in the transmission coil 300, 500 with the multilayer structure using the inverter voltage of the terminal.

Further, the controller 310 may scan the entire area of the charging pad, and generate a magnetic field in response to detection of the power receiver positioned on the charging pad as a result of scanning.

The power transmitter 320 may wirelessly transmit, to the reception coil of the power receiver, the power signal generated using magnetic fields generated by the plurality of coil layers constituting the transmission coil with the multilayer structure.

The power receiver may refer to at least one information technology (IT) device of a mobile device such as a "drone", a wearable device such as a smart watch, and a smart device such as a smart phone or a tablet personal computer (PC).

Figure 4:
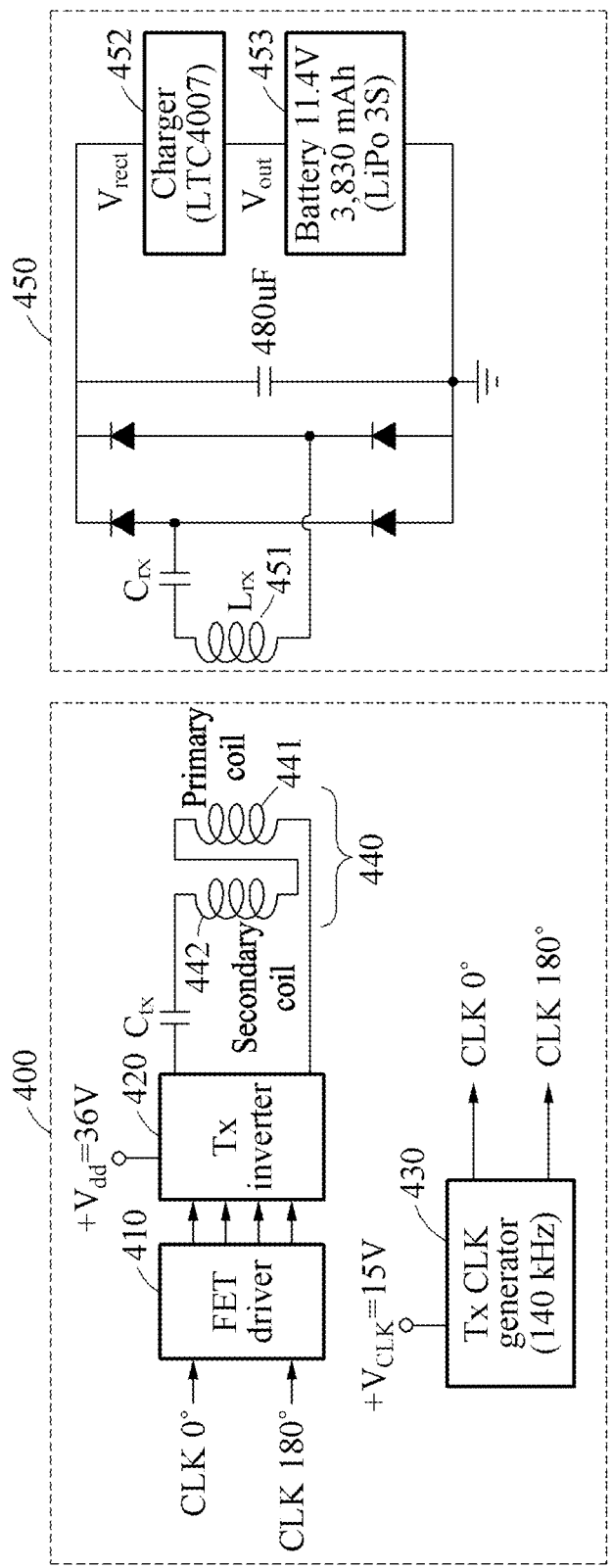
FIG. 4 illustrates a configuration of a wireless power transmitting device according to an example embodiment.

For example, referring to FIG. 4, the controller 310 of the wireless power transmitting device 300, 400 may generate a magnetic field by applying an inverter voltage to each of a primary coil 441 forming the first coil layer and a secondary coil 442 forming the second coil layer which is smaller than the first coil layer. The power transmitter 320 of the wireless power transmitting device 300, 400 may transmit, to a reception coil 451 of a power receiver 450, the power signal generated using the magnetic fields generated simultaneously by the first coil layer and the second coil layer. A charger 452 of the power receiver 450 may charge a battery 453 through the power signal received through the reception coil 451.

The transmission coil 330 may have a multilayer structure in which a plurality of coil layers of different sizes are stacked. In an example, the plurality of coil layers may be stacked in a tapered form.

Here, the transmission coil 330 may have a circular shape or a polygonal shape such as rectangular shape, and the transmission coil 330 may be designed in at least one of a solenoid structure and a flat helical structure. For example, referring to FIG. 5, the transmission coil 330, 500 may include coils of various shapes such as a solenoid coil structure and a flat helical structure. The transmission coil 330, 500 may be wound in a circular shape as shown in FIG. 5, or may be wound in a rectangular shape in a case in which the charging pad has a rectangular shape.

In detail, the plurality of coil layers may include the first coil layer (see 510 of FIG. 5) configured to have a maximum external diameter based on a maximum area of the charging pad, and the second coil layer (see 520 of FIG. 5) configured to have a diameter less than the maximum external diameter of the first coil layer, the second coil layer provided on one side of the first coil layer to overlap the first coil layer such that the first coil layer and the second coil layer may be concentric.

Here, the first coil layer may have the maximum external diameter which is greater than or equal to a diameter of the reception coil (see 541 or 542 of FIG. 5). That is, the first coil layer may face the reception coil of the power receiver while forming the uppermost layer of the transmission coil 330. Thus, the first coil layer may be configured to have the maximum external diameter at least greater than or equal to the size of the reception coil and less than or equal to the maximum area of the charging pad, thereby expanding a wireless charging coverage.

The second coil layer may be provided on the one side of the first coil layer which is opposite to a position of the power receiver on the charging pad. That is, the second coil layer may be provided on a bottom of the first coil layer to overlap the first coil layer, and a concentric structure of the first coil layer and the second coil layer may enhance the magnetic field that decreases in the central area of the transmission coil.

The secondary coil forming the second coil layer may be connected in series the primary coil forming the first coil layer. That is, the transmission coil 330 may include a plurality of coil layers of different sizes (areas), and the primary coil and the secondary coil forming the coil layers may be connected in series to form a single transmission coil 330. Thus, the wireless power transmitting device 300 may be relatively simply manufactured through a structural change of the transmission coil 330, without using a control circuit to control multiple transmission coils.

Further, each of the plurality of coil layers may include a plurality of coil turns, and diameters of the plurality of coil turns of each coil layer may be equal or decrease in proportion to the number of windings.

For example, referring to FIG. 5, the transmission coil 330, 500 may have a structure in which the first coil layer 510, the second coil layer 520, and the third coil layer 530 are stacked. Each of the plurality of coil layers 510 through 530 may be formed by winding a coil four times, and thus include four coil turns. Diameters of the coil turns in the same coil layer may be set equally, or may be set to gradually decrease. In the latter case, the transmission coil 330, 500 may have a dish structure with inclined sides.

In an example, the power transmitter 320 may generate the power signal using a magnetic field generated by the first coil layer and a magnetic field generated by the second coil layer, in an area where the first coil layer and the second coil layer overlap.

In another example, the power transmitter 320 may generate the power signal using the magnetic field generated by the first coil layer, in an area where the first coil layer and the second coil layer do not overlap.

For example, referring to FIG. 5, the power signal may be generated using the magnetic field generated by the first coil layer 510 in the vicinity of a boundary surface where the first coil layer 510 and the second coil layer 520 do not overlap, and using both the magnetic fields generated by the first coil layer 510 and the second coil layer 520 in the central area where the first coil layer 510 and the second coil layer 520 overlap. That is, the intensity of the magnetic field 503 generated by the transmission coil 330, 500 may be uniformly distributed in the entire area, unlike the example of FIG. 2 in which the intensity of the magnetic field 203 decreases toward the central area.

In another example, the plurality of coil layers may further include a third coil layer configured to have a lesser diameter than the second coil layer, the third coil layer provided on one side of the second coil layer to overlap the second coil layer such that the first coil layer, the second coil layer, and the third coil layer may be concentric.

In this example, the power transmitter 320 may generate the power signal using the magnetic field generated by the first coil layer, the magnetic field generated by the second coil layer, and a magnetic field generated by the third coil layer, in an area where the first coil layer, the second coil layer, and the third coil layer overlap.

For example, referring to FIG. 5, the transmission coil 330, 500 with the multilayer structure may be manufactured in a structure in which an additional coil is provided to overlap near the central area of the transmission coil 330, 500, in case the maximum area of the charging pad expands further.

Further, in a case in which the intensity of the magnetic field in the central area of the first coil layer and second coil layer is less than or equal to a threshold, the controller 310 may additionally generate a magnetic field through the third coil layer, in addition to the first coil layer and the second coil layer.

Here, the threshold may be set to be the intensity of the magnetic field generated by the first coil layer in the vicinity of the boundary surface where the first coil layer and the second coil layer do not overlap, set to be a mean value of the intensity of the magnetic field generated in the entire transmission coil 330, or set to be an intensity of a magnetic field adequate to generate the power signal.

In another example, the transmission coil 330 may include at least one magnetic substance disposed at a core of the plurality of coil layers. In this example, the power transmitter 320 may generate the power signal using a magnetic field that changes by the magnetic substance.

The magnetic substance may include at least one of ferrite core and ferrite sheet, and may have a polygonal shape or a circular shape with a diameter proportional to the maximum external diameter of the first coil layer.

Figure 6:
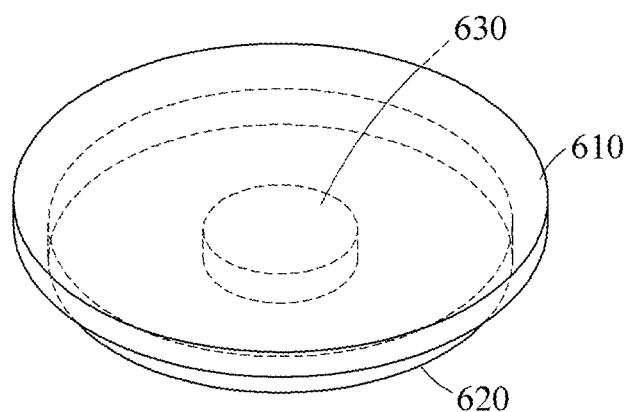
FIG. 6 illustrates an example of additionally disposing a magnetic substance at a core of a transmission coil in a wireless power transmitting device according to an example embodiment.

For example, referring to FIG. 6, the power transmitter 320 may enhance an intensity of a magnetic field that decreases in a central area of a first coil layer 610 using all a magnetic field generated by the first coil layer 610, a magnetic field generated by a second coil layer 620 which is smaller than the first coil layer 610, and a magnetic field generated by a magnetic substance 630 disposed at a core of the second coil layer 620, whereby the intensity of the magnetic field may be uniform in the entire area of the transmission coil 330.

In an example, the controller 310 may additionally generate a magnetic field through an additional coil layer or a magnetic substance disposed at a core of the plurality of coil layers in response to verification that a charging efficiency or a rectified voltage is less than or equal to a predetermined reference value, from data obtained from the power receiver after the transmission of the power signal.

As described above, a wireless power transmitting device may enhance a magnetic field that decreases in a central area of a transmission coil by improving a structure of the transmission coil in a charging pad to a multilayer structure in which a plurality of coil layers are stacked in a tapered form, thereby expanding a wireless charging coverage on the charging pad and maintaining a uniform charging efficiency in the entire area irrespective of a charging position.

FIG. 4 illustrates a configuration of a wireless power transmitting device according to an example embodiment.

Referring to FIG. 4, a wireless power transmitting device 400 may include a field effect transistor (FET) driver 410, a transmission (Tx) inverter 420, a Tx clock (CLK) generator 430, and a transmission coil 440 with a multilayer structure.

The FET driver 410 may transmit a voltage application signal to the Tx inverter 420 in response to detection of a power receiver within a predetermined separation distance from a charging pad.

The Tx inverter 420 may generate a single inverter voltage and apply the generated single inverter voltage to the transmission coil 440 with the multilayer structure, in response to reception of the voltage application signal.

The transmission coil 440 with the multilayer structure may have a structure in which the primary coil 441 and the secondary coil 442 are stacked. Here, the coil layers may be stacked in a tapered form.

Here, the primary coil 441 may be provided in a size greater than or equal to that of the reception coil 451 of the power receiver 450, and may generate a magnetic field using the inverter voltage.

The secondary coil 442 may be smaller than the primary coil 441, be provided in a direction opposite to a position of the reception coil 451 from the primary coil 441, and generate a magnetic field using the inverter voltage.

That is, the transmission coil 330, 500 may generate a magnetic field of a uniform intensity in the entire area using the magnetic fields generated simultaneously by the primary coil 441 and the secondary coil 442.

The FET driver 410 may generate a power signal using the magnetic field generated by the transmission coil 440 with the multilayer structure, and wirelessly transmit the power signal to the reception coil 451 of the power receiver 450 based on a clock signal output from the Tx CLK generator 430.

The power receiver 450 may include the reception coil 451, the charger 452, and the battery 453. The charger 452 may charge the battery 453 using the power signal received through the reception coil 451.

FIG. 5 illustrates a structure of a transmission coil in a wireless power transmitting device according to an example embodiment.

Referring to FIG. 5, the transmission coil 500 used in a wireless power transmitting device may generate a magnetic field to generate a power signal in response to application of an inverter voltage.

The transmission coil 500 with the multilayer structure suggested herein may be formed by stacking the plurality of coil layers 510 through 530 in a tapered form.

In an example, the first coil layer 510 may be a coil layer facing the reception coil 541 or 542 of the power receiver. The first coil layer 510 may be provided in a size greater than or equal to that of the reception coil 541 or 542, thereby facilitating power charging of the power receiver.

In addition, the first coil layer 510 may be an uppermost coil layer of the transmission coil 500 in the charging pad. The first coil layer 510 may be configured to have a maximum external diameter based on a maximum area of the charging pad, thereby expanding a wireless charging coverage.

The second coil layer 520 may be a coil layer provided on a bottom of the first coil layer 510 to overlap the first coil layer 510. The second coil layer 520 may be configured to have a diameter less than the maximum external diameter of the first coil layer 510, thereby enhancing an intensity of a magnetic field generated in an area (central area) where the first coil layer 510 and the second coil layer 520 overlap.

The third coil layer 530 may be a coil layer provided on a bottom of the second coil layer 520 to overlap the second coil layer 520. The third coil layer 530 may be configured to have a lesser diameter than the second coil layer 520, thereby enhancing an intensity of a magnetic field generated in an area where the first coil layer 510, the second coil layer 520, and the third coil layer 530 overlap.

The wireless power transmitting device may transmit the power signal to the reception coil 541 or 542 of the power receiver using the magnetic field 503 generated at a uniform intensity in the entire area of the transmission coil 500 with the multilayer structure.

A primary coil forming the first coil layer 510, a secondary coil forming the second coil layer 520, and a tertiary coil forming the third coil layer 530 may be connected in series to have the same current direction.

That is, the transmission coil 500 may have a structure in which the plurality of coil layers of different sizes are stacked, and the primary, secondary, and tertiary coils forming the coil layers may be connected in series to form a single transmission coil 500. Thus, a signal 501 fed through the first coil layer 510 of the transmission coil 500 may pass through the second coil layer 520 and be output from the third coil layer 530. That is, the signal 501 fed through the first coil layer 510 may be the same as a signal 502 output from the third coil layer 530.

Further, each of the plurality of coil layers 510 through 530 may include a plurality of coil turns, and diameters of the coil turns of each coil layer 510, 520, 530 may be equal or gradually decrease in proportion to the number of windings.

As shown in FIG. 5, the first coil layer 510 formed by winding the primary coil four times may include four coil turns, the second coil layer 520 formed by winding the secondary coil four times may include four coil turns, and the third coil layer 530 formed by winding the tertiary coil four times may include four coil turns.

Coil turns in the same coil layer may have equal diameters (sizes) as shown in FIG. 5, or may have diameters that gradually decrease. In the latter case, the transmission coil 500 may have a dish structure with inclined sides.

In the wireless power transmitting device, a single transmission coil 500 having a high Q value (capacitance, electrostatic capacity) may be disposed to have different diameters and a predetermined height difference.

That is, the transmission coil 500 may be formed by connecting, in series, the primary coil wound to have a size (for example, a diameter of "260 mm") equal to the maximum area of the charging pad and thereby expand a wireless charging coverage, and the secondary coil wound to have a slightly lesser diameter (for example, "230 mm") than the primary coil and disposed under the primary coil. In this example, the primary coil and the secondary coil may be disposed to have the same current direction, whereby the intensity of the magnetic field may increase in the central area of the transmission coil 500.

In addition, the intensity of the magnetic field in the central area of the transmission coil 500 may decrease as the diameter of the primary coil increases due to a great size of the power receiver or the reception coil of the power receiver, or an extremely wide wireless charging coverage required for simultaneous charging of multiple power receivers. To prevent such decrease in the intensity of the magnetic field, tertiary or higher coils may be additionally disposed under the secondary coil.

FIG. 6 illustrates an example of additionally disposing a magnetic substance at a core of a transmission coil in a wireless power transmitting device according to an example embodiment.

Referring to FIG. 6, a wireless power transmitting device may additionally dispose the magnetic substance 630 such as ferrite core or ferrite sheet, thereby generating a more uniform magnetic field in the entire area of a transmission coil 600.

As in FIG. 6, the transmission coil 600 may be formed by connecting, in series, the primary coil 610 formed in a size (for example, a diameter of "260 mm") equal to the maximum area of the charging pad, and the secondary coil 620 formed to have a slightly lesser diameter (for example, "230 mm") than the primary coil 610 and disposed under the primary coil 610.

In this example, the magnetic substance 630 may be disposed on a bottom of the secondary coil 620. As the distribution of the magnetic fields generated by the primary coil 610 and the secondary coil 620 changes due to a magnetic field generated by the magnetic substance 630, the intensity of the magnetic field in the central area of the transmission coil 600 may be enhanced.

Here, the distribution of the magnetic fields may change depending on a diameter, a height, or a material of the magnetic substance 630. Thus, the diameter of the magnetic substance 630 may need to increase as the diameter of the primary coil 610 increases.

Figure 7A:
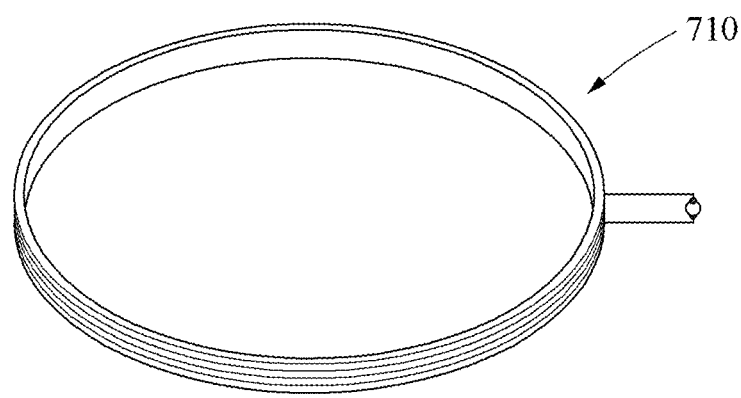
FIGS. 7A through 7C illustrate examples of structures and shapes of transmission coils in wireless transmitting devices according to an example embodiment.
Figure 7B:
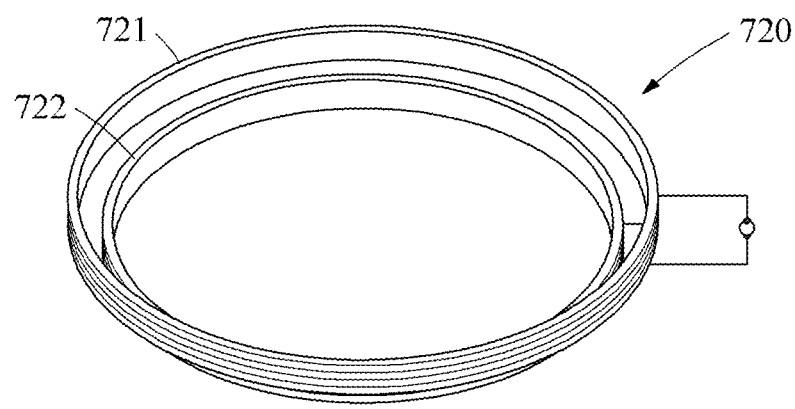
Figure 7C:
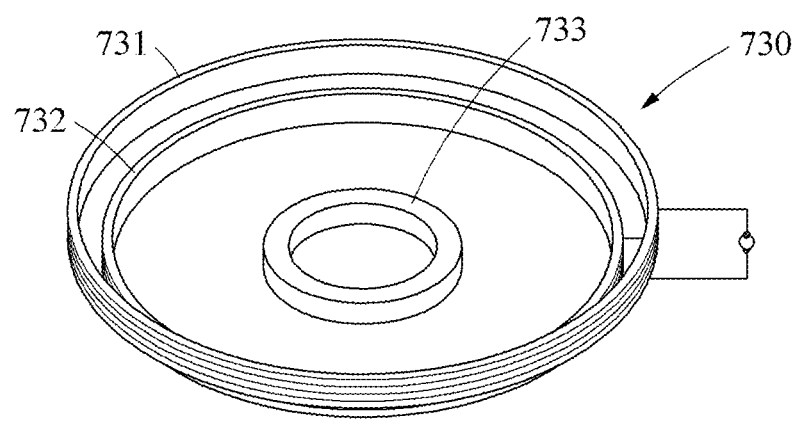

FIGS. 7A through 7C illustrate examples of structures and shapes of transmission coils in wireless transmitting devices according to an example embodiment, and FIG. 8 is a table illustrating design specifications of transmission coils used in wireless power transmitting devices according to an example embodiment.

Referring to FIGS. 7A through 8, a wireless power transmitting device may transmit a power signal to a reception coil 910 of a power receiver by generating magnetic fields using transmission coils 710 through 730 with various specifications as shown in FIG. 8.

In an example, the transmission coil 710 is a single coil wound a number of times ("four times") with a predetermined diameter ("260 mm"), and a coil layer formed by the transmission coil 710 may have four coil turns ("the number of turns") corresponding to the number of windings of the coil and be formed in a predetermined height (about 10 mm).

In another example, the transmission coil 720 may have a structure in which a secondary coil 722 wound two times with a lesser diameter ("230 mm") than a primary coil 721 is disposed under the primary coil 721 wound three times with a predetermined diameter ("260 mm"), and may be a single coil formed by connecting the primary coil 721 and the secondary coil 722 in series.

A first coil layer formed by the primary coil 721 and a second coil layer formed by the secondary coil 722 may have coil turns similar to the number of turns ("four") of the transmission coil 710 such that the transmission coil 710 and the transmission coil 720 may have similar rectified voltages. That is, the first coil layer may have three coil turns, and the second coil layer may have two coil turns. In addition, the first coil layer and the second coil layer may be formed in a height (about 10 mm) equal to that of the transmission coil layer 710.

A structure of the transmission coil 720 in which the primary coil 721 and the secondary coil 722 of different sizes are stacked may achieve a uniform intensity of a magnetic field in the entire area of the charging pad.

That is, irrespective of whether the reception coil 910 is positioned on an edge side (in the vicinity of the boundary surface) of the transmission coil 720 or at a core of the transmission coil 720, the charging efficiency may be maintained similarly and the power receiver may be charged in the entire area without a null-point.

Further, in a case in which the diameter of the primary coil 721 further increases to expand a wireless charging coverage, tertiary or higher coils may be additionally stacked under the secondary coil 922 in a tapered form such that the magnetic field may be distributed to be uniform in the entire area of the transmission coil 720.

In still another example, the transmission coil 730 may be designed in a structure in which a magnetic substance 733 such as ferrite core is added at a core of the transmission coil 720.

That is, the transmission coil 730 may have a structure in which a secondary coil 732 wound two times with a lesser diameter ("230 mm") than a primary coil 731 is disposed under the primary coil 731 wound three times with a predetermined diameter ("260 mm"), and may be a single coil formed by connecting the primary coil 731 and the secondary coil 732 in series and disposing the magnetic substance 733 at a core of a bottom of the secondary coil 732.

Here, the magnetic substance 733 may prevent an intensity of a magnetic field in a central area of the transmission coil 730 from being less than an intensity of a magnetic field in a vicinity of a boundary of the transmission coil 730, thereby enabling the magnetic field to be distributed to be more uniform in the entire wireless charging coverage.

The power receiver (for example, a "drone") including the reception coil 910 may be wirelessly charged with a predetermined charging efficiency using the magnetic field uniformly distributed on the transmission coil 720, 730, at any position on the transmission coil 720, 730.

Here, the reception coil 910 may be provided in a rectangular shape of a predetermined size (for example, width 120 mm, height 105 mm), or may be provided in a circular shape having a predetermined diameter, like the transmission coils 710 through 730.

The reception coil 910 may have twelve coil turns based on the number of windings of the coil, and may be provided in a lesser height (about 3 mm) than the transmission coils 710 through 730.

Figure 9A:
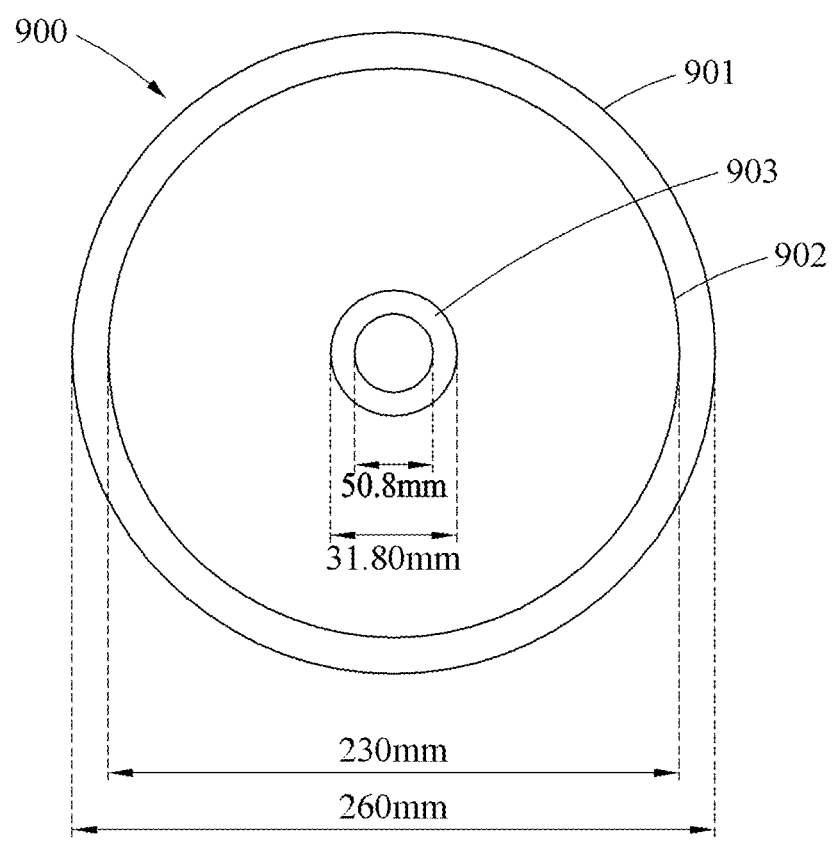
FIG. 9A is a top view illustrating a transmission coil in a wireless power transmitting device according to an example embodiment.
Figure 9B:
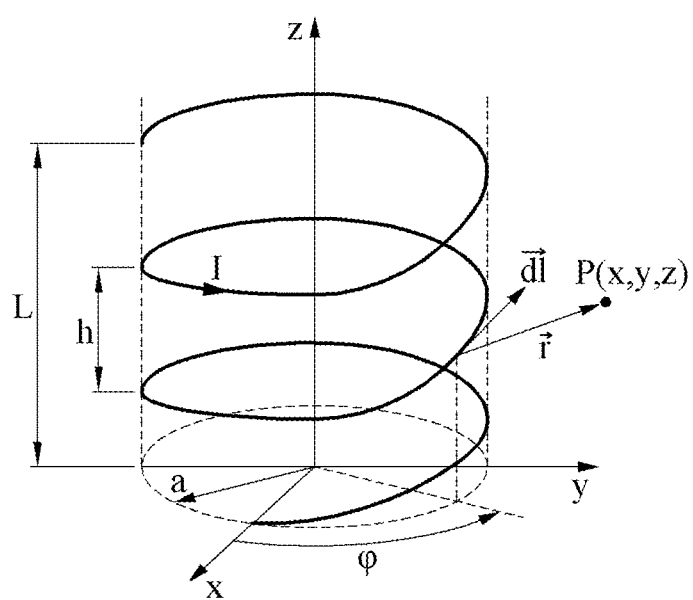
FIG. 9B is a three-dimensional view designed for formula calculation according to an example embodiment.
Figure 9C:
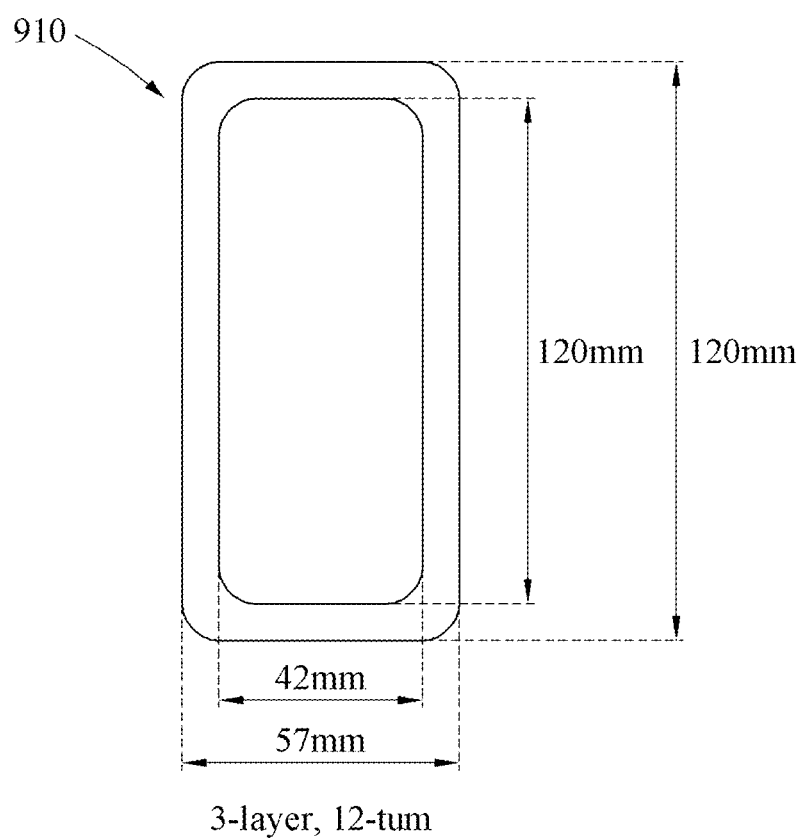
FIG. 9C is a top view illustrating a reception coil according to an example embodiment.
Figure 9D:
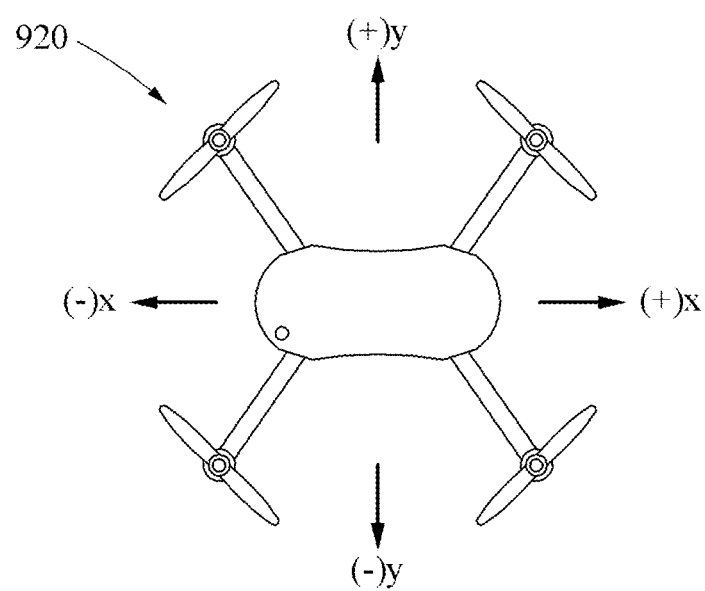
FIG. 9D illustrating an example of moving directions of a reception coil according to an example embodiment.

FIG. 9A is a top view illustrating a transmission coil in a wireless power transmitting device, FIG. 9B is a three-dimensional view designed for formula calculation, FIG. 9C is a top view illustrating a reception coil, and FIG. 9D illustrating an example of moving directions of the reception coil according to an example embodiment.

Referring to FIG. 9A, a transmission coil 900 may have a structure in which a primary coil 901 and a secondary coil 902 connected in series are stacked while forming coil layers of different sizes.

That is, the primary coil 901 may form a first coil layer by being wound a number of times with a predetermined diameter ("260 mm"), and the secondary coil 902 with a lesser diameter ("230 mm") than the primary coil 901 may form a second coil layer by being wound a number of times under the primary coil 901.

Here, the transmission coil 900 may have a circular or polygonal shape, and a magnetic substance 903 of a circular or polygonal shape may be disposed at a core of the transmission coil 900.

FIG. 9B is a three-dimensional view illustrating a transmission coil for formula calculation.

In FIG. 9B, L denotes a height of the coil, h denotes a pitch of the coil, L/h denotes the number of coil turns, I denotes a current flowing in the coil, a denotes a radius of the coil, p' denotes a predetermined point on the coil, p denotes a predetermined observation point outside the coil, φ denotes a rotation angle on an x axis (y=0), $\vec{r}$ denotes a vector component in a direction from p' to p, and $\vec{dl}$ denotes a vector component in a direction of I.

Using the transmission coil as shown in FIG. 9B, a formula to calculate a magnetic flux density $B_z$ [T] may be induced, as expressed by Equation 1.

$$B_z(x, y, z) = \frac{\mu_0 I}{4\pi} \int_0^{\frac{2\pi L}{h}} \frac{-a\sin\varphi(y - a\sin\varphi) - a\cos\varphi(x - a\cos\varphi)}{\left[(x - a\cos\varphi)^2 + (y - a\sin\varphi)^2 + \left(z - \frac{h}{2\pi}\varphi\right)^2\right]^{3/2}} d\varphi \quad \text{[Equation 1]}$$

Further, a formula to calculate a magnetic field intensity $H_z$ [A/m] may be induced based on $$B = \mu H, \quad L = \frac{h}{2\pi}\varphi,$$

in view of only a z-axial component which is perpendicular to a charging area, as expressed by Equation 2 or Equation 3.

In a case of using a single helical transmission coil, the magnetic field intensity $H_z$ may be obtained by Equation 2 (if x=0, z=20 mm, −150≤y[mm]≤+150).

$$H_z(x, y, z) = \frac{I}{4\pi} \int_0^{\frac{2\pi L}{h}} \frac{-a\sin\varphi(y - a\sin\varphi) - a\cos\varphi(x - a\cos\varphi)}{\left[(x - a\cos\varphi)^2 + (y - a\sin\varphi)^2 + \left(z - \frac{h}{2\pi}\varphi\right)^2\right]^{3/2}} d\varphi \quad \text{[Equation 2]}$$

Further, in a case of using at least two helical transmission coils, Equation 3 to calculate the magnetic field intensity $H_z$ based on the superposition principle may be newly induced. Here, N denotes the number of used coils (if x=0, $z_1$=20 mm, $z_2$=30 mm, −150≤y[mm]≤+150).

$$H_z^{total}(x, y, z) = \sum_{i=1}^{N} \frac{(-a_i I)}{4\pi} \int_0^{\frac{2\pi L_i}{h_i}} \frac{\sin\varphi(y - a_i\sin\varphi) + \cos\varphi(x - a_i\cos\varphi)}{\left[(x - a_i\cos\varphi)^2 + (y - a_i\sin\varphi)^2 + \left(z_i - \frac{h_i}{2\pi}\varphi\right)^2\right]^{3/2}} d\varphi \quad \text{[Equation 3]}$$

Referring to FIG. 9C, the reception coil 910 may be manufactured in a structure in which a plurality of layers (for example, three layers) are stacked, in a rectangular shape of a predetermined size (for example, width 57 mm, height 120 mm). Here, the reception coil 910 may be manufactured in various shapes such as a circular or polygonal shape depending on an application field. The reception coil 910 may have the number of turns (about twelve) corresponding to the number of windings of the coil and be provided in a lesser height (about 3 mm) than the transmission coil 900.

FIG. 9D illustrates directions in which the power receiver 920 including the reception coil 910 moves to scan a wireless charging coverage of a charging pad. Referring to FIG. 9D, the power receiver 920, that is, a "drone", may verify the wireless charging coverage of the charging pad by verifying a distribution of a magnetic field while moving in a +x-axial direction, a -x-axial direction, a +y-axial direction, or a -y-axial direction on a horizontal plane a predetermined distance (for example, "5 mm") spaced apart from the charging pad.

Figure 10A:
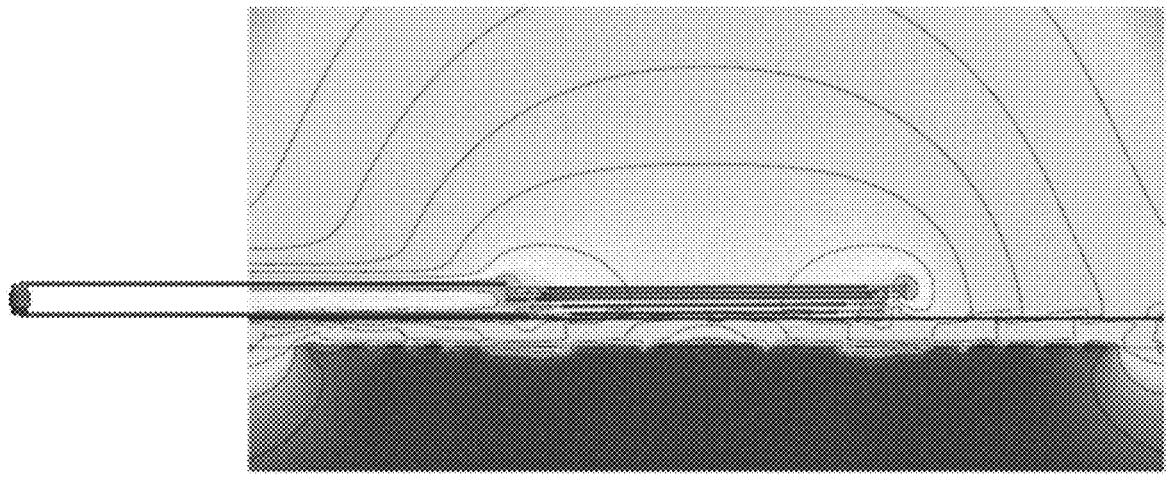
FIGS. 10A and 10B illustrate near-field simulation results with respect to magnetic fields of transmission coils in wireless power transmitting devices according to an example embodiment.
Figure 10B:
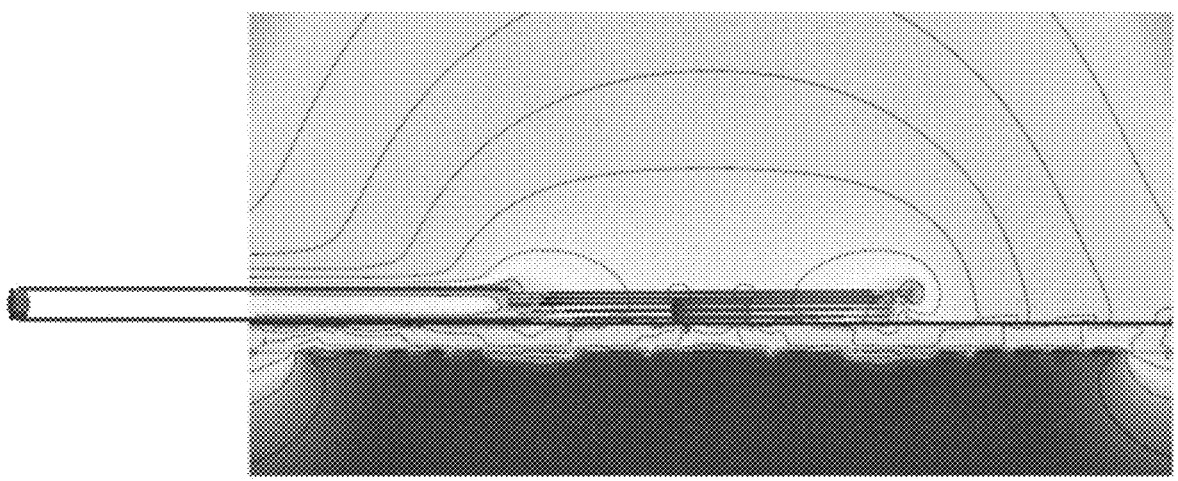

FIGS. 10A and 10B illustrate near-field simulation results with respect to magnetic fields of transmission coils in wireless power transmitting devices according to an example embodiment.

In FIGS. 10A and 10B, near-field simulation results with respect to the magnetic fields generated by the transmission coils 720 and 730 of FIGS. 7B and 7C are illustrated.

Figure 2:
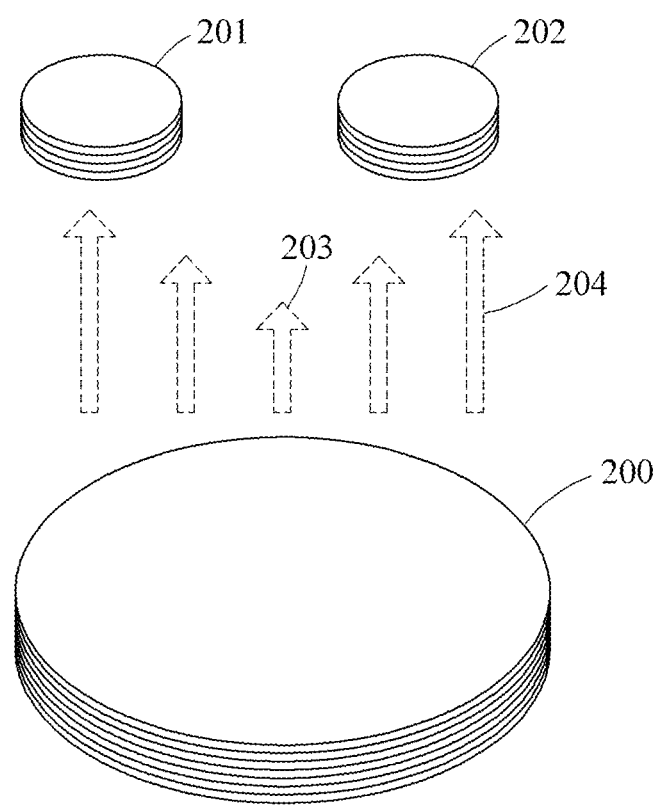
FIG. 2 illustrates a transmission coil in a wireless power transmitting device according to a related art.

Referring to FIG. 10A, it may be learned that the transmission coil 720 of FIG. 7B may achieve a uniform intensity of a magnetic field in a central area, when compared to the existing transmission coil 200 of FIG. 2.

Referring to FIG. 10B, the transmission coil 730 of FIG. 7C may have a structure in which a magnetic substance ("ferrite core") is added at the core of the transmission coil 720 of FIG. 7B, and may achieve a more uniform intensity of a magnetic field since the magnetic substance enhances the intensity of the magnetic field in the central area.

Figure 11:
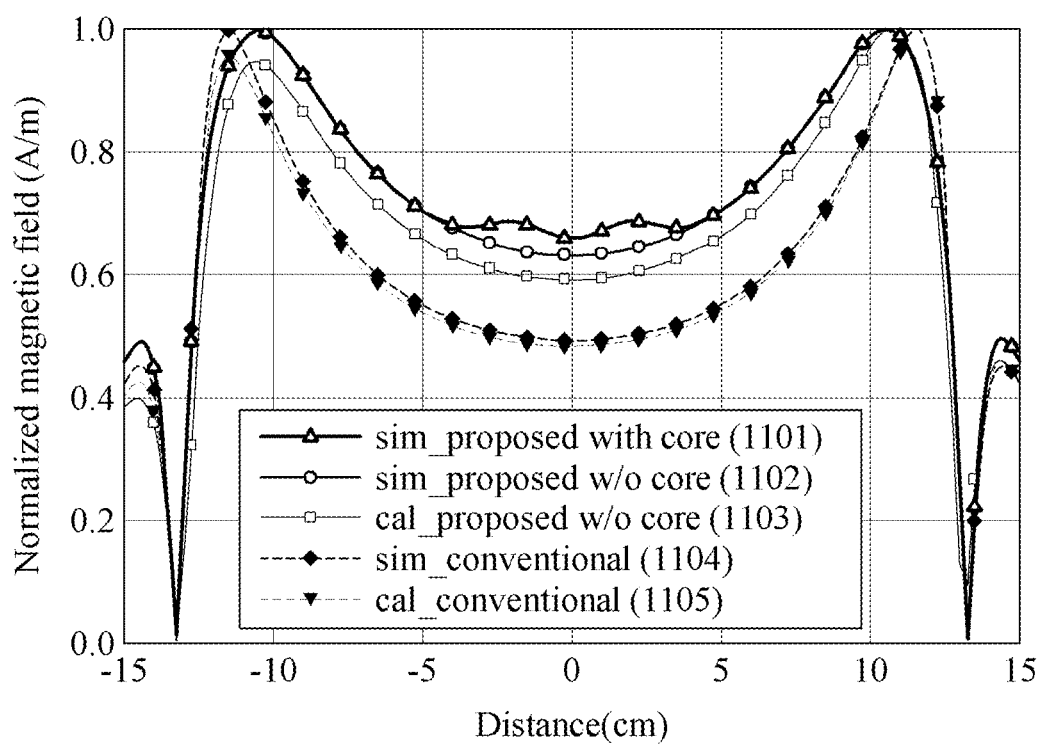
FIG. 11 is a graph illustrating a simulation result with respect to a normalized magnetic field generated by a transmission coil in a wireless power transmitting device according to an example embodiment.

FIG. 11 is a graph illustrating a simulation result with respect to a normalized magnetic field generated by a transmission coil in a wireless power transmitting device according to an example embodiment.

In FIG. 11, a change in a normalized magnetic field with respect to a distance from a core of a transmission coil is illustrated for each transmission coil.

A graph 1101 illustrates a change in a magnetic field in the transmission coil 730 of FIG. 7C with the multilayer structure including a magnetic substance at a core thereof, and graphs 1102 and 1103 illustrate changes in a magnetic field in the transmission coil 720 of FIG. 7B with the multilayer structure not including a magnetic substance at a core thereof. Graphs 1104 and 1105 illustrate changes in a magnetic field in the transmission coil 200 of FIG. 2 with the single-layer structure not including a magnetic substance at a core thereof. The graphs 1101, 1102 and 1104 are FEKO simulation results, and the graph 1103 and 1105 are formula calculation results, where Hz components are normalized and compared.

When comparing the graphs 1103 and 1105, it may be learned that the intensity ("0.6") of the magnetic field at the core (a distance "0") of the transmission coil 720 of FIG. 7B with the multilayer structure is greater than the intensity ("0.5") of the magnetic field at the core (a distance "0") of the transmission coil 200 of FIG. 2 with the single-layer structure not including a magnetic substance at the core thereof. That is, in a case of using the transmission coil 720 of FIG. 7B with the multilayer structure, the magnetic field at the core may be enhanced when compared to the existing transmission coil 200 of FIG. 2 such that a more uniform magnetic field may be generated.

Figure 12A:
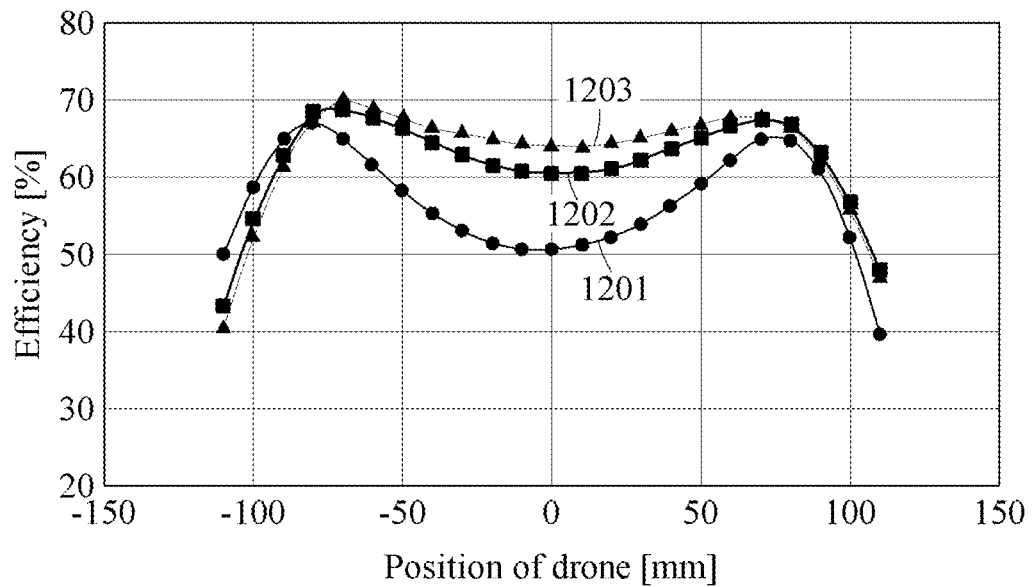
FIGS. 12A and 12B are graphs illustrating charging efficiencies that change based on a position of a power receiver, in a wireless power transmitting device according to an example embodiment.
Figure 12B:
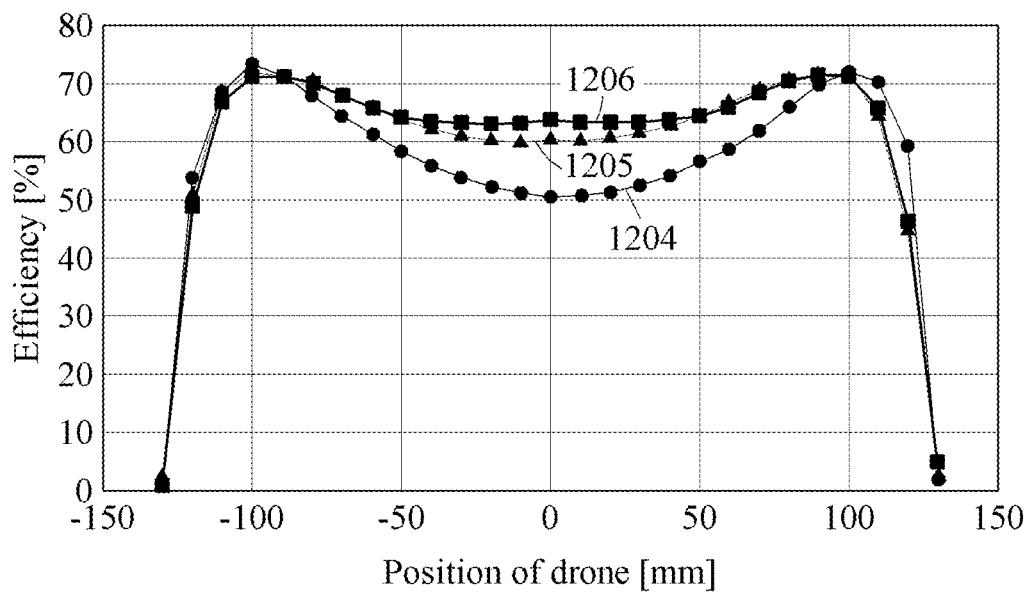

FIGS. 12A and 12B are graphs illustrating charging efficiencies that change based on a position of a power receiver, for example, a "drone", in a wireless power transmitting device according to an example embodiment.

FIG. 12A illustrates a result of simulating a change in a charging efficiency with respect to an x-axial position of the drone including a reception coil, and FIG. 12B illustrates a result of simulating a change in a charging efficiency with respect to a y-axial position of the drone.

Here, a separation distance between each transmission coil and the reception coil may be equally set to 5 mm, an inverter voltage may be set to 36 volts (V), and a frequency to be used may be set to 140 kilohertz (kHz). That is, the wireless power transmitting device may maintain a uniform charging efficiency using a single voltage inverter, without a separate control and varying the inverter voltage.

Graphs 1201 and 1204 illustrate changes in a charging efficiency when using the existing transmission coil 200 of FIG. 2, graphs 1202 and 1205 illustrate changes in a charging efficiency when using the transmission coil 720 of FIG. 7B with the multilayer structure in which a plurality of coil layers of different sizes are stacked, and graphs 1203 and 1206 illustrate changes in a charging efficiency when using the transmission coil 730 of FIG. 7C in which a magnetic substance is additionally disposed.

When comparing the graphs 1201 through 1206, the charging efficiencies when using the transmission coils 720 and 730 of FIGS. 7B and 7C with the structure suggested herein may be about 60% or higher in a case in which the drone is positioned in the vicinity of the core of the transmission coil (x axis "0", y axis "0"). It may be learned that the transmission coils 720 and 730 may improve the charging efficiencies, when compared to the charging efficiency ("50%") when using the existing transmission coil 200 of FIG. 2.

That is, the uniform charging efficiency may be maintained in the entire area of the transmission coil 720 of FIG. 7B, 730 of FIG. 7C, whereby the power receiver including the drone may be charged with a predetermined efficiency at any position on the transmission coil.

Figure 13A:
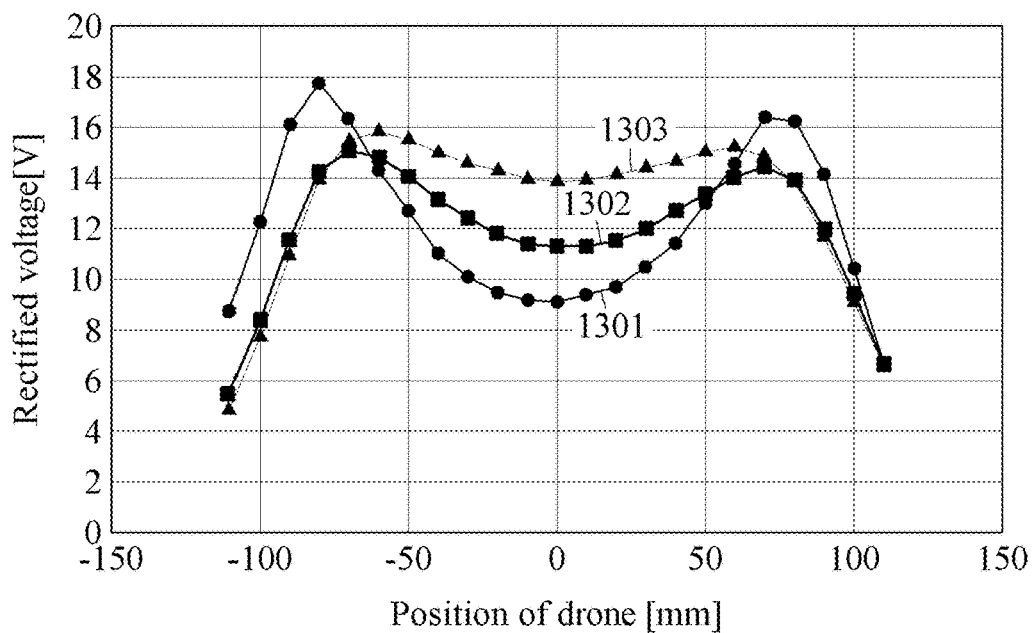
FIGS. 13A and 13B are graphs illustrating rated voltages that change based on a position of a power receiver, in a wireless power transmitting device according to an example embodiment.
Figure 13B:
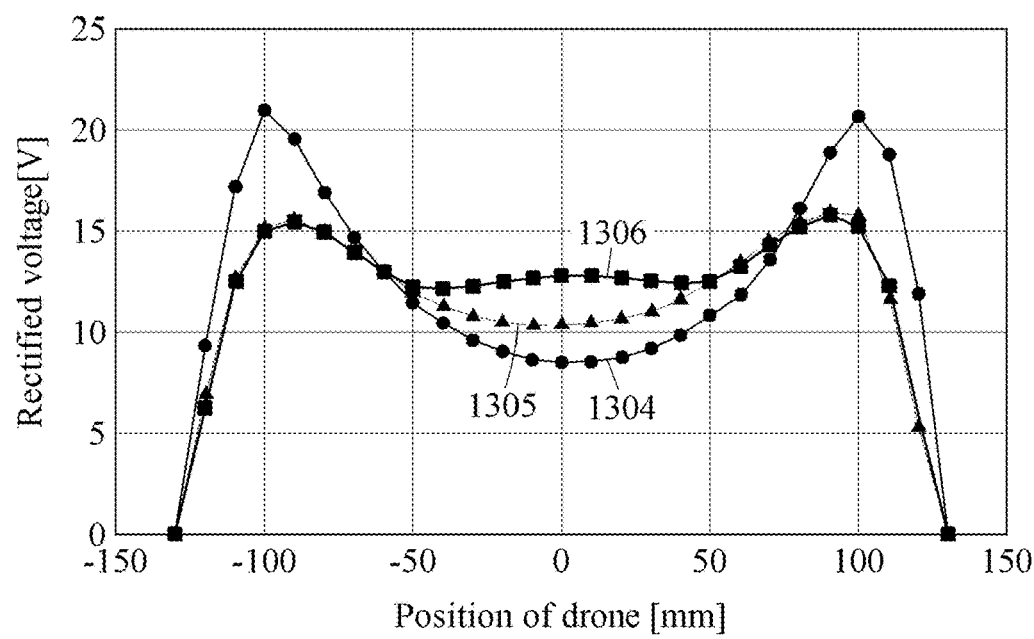

FIGS. 13A and 13B are graphs illustrating rated voltages that change based on a position of a power receiver, in a wireless power transmitting device according to an example embodiment.

FIG. 13A illustrates a result of simulating a change in a rectified voltage with respect to an x-axial position of a drone including a reception coil, and FIG. 13B illustrates a result of simulating a change in a rectified voltage with respect to a y-axial position of the drone. Here, a separation distance between each transmission coil and the reception coil may be equally set to 5 mm, an inverter input voltage may be set to 36 V, and a frequency to be used may be set to 140 kHz.

Graphs 1301 and 1304 illustrate changes in a rectified voltage when using the existing transmission coil 200 of FIG. 2, graphs 1302 and 1305 illustrate changes in a rectified voltage when using the transmission coil 720 of FIG. 7B with the multilayer structure in which a plurality of coil layers of different sizes are stacked, and graphs 1303 and 1306 illustrate changes in a rectified voltage when using the transmission coil 730 of FIG. 7C in which a magnetic substance (ferrite core) is additionally disposed.

When comparing the graphs 1301 through 1306, the rectified voltages when using the transmission coils 720 and 730 of FIGS. 7B and 7C with the structure suggested herein may be about 12 V or higher in a case in which the drone is positioned in the vicinity of the core of the transmission coil (x axis "0", y axis "0"). It may be learned that the transmission coils 720 and 730 may improve the rectified voltages, when compared to the rectified voltage ("9 V") when using the existing transmission coil 200 of FIG. 2.

That is, the uniform rectified voltage may be maintained in the entire area of the transmission coil 720 of FIG. 7B, 730 of FIG. 7C, whereby the power receiver including the drone may be charged with a predetermined rectified voltage at any position on the transmission coil.

As described above, in a case of using the transmission coils 720 and 730 of FIGS. 7B and 7C with the structure suggested herein, a wider wireless charging coverage may be secured than the structure of the existing transmission coil 200 of FIG. 2, and the charging efficiencies and the rectified voltages may change little with respect to the position of the power receiver, when compared to the related art, and thus a wireless charging environment not requiring a separate control may be created.

Hereinafter, a task flow of the wireless power transmitting device 300 will be described in detail with reference to FIG. 14.

FIG. 14 is a flowchart illustrating a wireless power transmitting method according to an example embodiment.

The wireless power transmitting method may be performed by the wireless power transmitting device 300 of FIG. 3.

Referring to FIG. 14, in operation 1410, the wireless power transmitting device 300 may determine whether a power receiver is detected within a predetermined separation distance from a charging pad.

In response to detection of a power receiver, the wireless power transmitting device 300 may generate a magnetic field through a transmission coil with a multilayer structure in the charging pad, in operation 1420.

For example, referring to FIG. 5, the wireless power transmitting device 300 may generate the magnetic field 503 by applying a single inverter voltage to each of the plurality of coil layers 510, 520 and 530 in the transmission coil 500 in response to detection of the reception coil 541 or 542 disposed on a rear side of the power receiver, on a horizontal surface, for example, 5 mm spaced apart from the first coil layer 510 which is an uppermost layer of the transmission coil 500 with the multilayer structure constituting the charging pad.

The transmission coil with the multilayer structure may be designed to have a structure in which a plurality of coil layers are stacked in a tapered form.

In detail, the plurality of coil layers may include the first coil layer (see 510 of FIG. 5) configured to have a maximum external diameter based on a maximum area of the charging pad, and the second coil layer (see 520 of FIG. 5) configured to have a diameter less than the maximum external diameter of the first coil layer, the second coil layer provided on one side of the first coil layer to overlap the first coil layer such that the first coil layer and the second coil layer may be concentric.

Here, the first coil layer may have the maximum external diameter which is greater than or equal to a diameter of the reception coil (see 541 or 542 of FIG. 5). That is, the first coil layer may face the reception coil of the power receiver while forming the uppermost layer of the transmission coil 330. Thus, the first coil layer may be configured to have the maximum external diameter at least greater than or equal to the size of the reception coil and less than or equal to the maximum area of the charging pad, thereby expanding a wireless charging coverage.

The second coil layer may be provided on one side of the first coil layer which is opposite to a position of the power receiver on the charging pad. That is, the second coil layer may be provided on a bottom of the first coil layer to overlap the first coil layer, and a concentric structure of the first coil layer and the second coil layer may enhance the magnetic field that decreases in the central area of the transmission coil.

Further, the transmission coil with the multilayer structure may be manufactured in a structure in which an additional coil is provided to overlap near the central area of the transmission coil, in case the maximum area of the charging pad expands further. That is, the plurality of coil layers may further include a third coil layer configured to have a lesser diameter than the second coil layer, the third coil layer provided on one side of the second coil layer to overlap the second coil layer such that the first coil layer, the second coil layer, and the third coil layer may be concentric.

In addition, the transmission coil with the multilayer structure may enable an intensity of a magnetic field to be more uniform in the entire area through a magnetic substance disposed therein.

For example, referring to FIG. 6, the wireless power transmitting device 300 may enhance the intensity of the magnetic field that decreases in a central area of the first coil layer 610 using all a magnetic field generated by the first coil layer 610, a magnetic field generated by the second coil layer 620 which is smaller than the first coil layer 610, and a magnetic field generated by the magnetic substance 630 disposed at a core of the second coil layer 620.

In operation 1430, the wireless power transmitting device 300 may wirelessly transmit, to a reception coil of the power receiver, a power signal generated using magnetic fields generated by the plurality of coil layers.

That is, when using the transmission coil suggested herein, a power receiver including a drone may be charged with a uniform rectified voltage and a uniform efficiency at any position on the transmission coil.

According to example embodiments, a wireless power transmitting device may enhance a magnetic field that decreases in a central area of a transmission coil in a charging pad by improving a structure of the transmission coil to a multilayer structure in which a plurality of coil layers are stacked in a tapered form, thereby expanding a wireless charging coverage on the charging pad and maintaining a uniform charging efficiency in the entire area of the transmission coil irrespective of a charging position.

According to example embodiments, a wireless power transmitting device may enable charging with a predetermined or higher efficiency at a predetermined position on a predetermined planar space (in particular, a circular or rectangular space), thereby achieving a wider horizontal freedom of degree and minimizing a charging shadow area. In an example, the wireless power transmitting device may be applied to a wireless power transmitting and charging system for mobile devices such as drones of various sizes having difficulties in accurately aligning a transmission coil and a reception coil due to landing errors, wearable devices such as smart watches, or various IT devices requiring a wide wireless charging coverage to simultaneously charge a number of smart devices.

According to example embodiments, a wireless power transmitting device may expand a wireless charging coverage at a predetermined distance, without a separate control, using a transmission coil significantly greater than a reception coil of a power receiver, thereby creating a more free wireless charging environment and increasing a convenience of a user using the device.

According to example embodiments, a wireless power transmitting device having a relatively wide wireless charging coverage may be simply manufactured using a transmission coil greater than a reception coil, without requiring multiple small transmission coils and a separate control circuit.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitting device, comprising:
    a controller configured to generate, in response to detection of a power receiver within a predetermined separation distance from a charging pad, a magnetic field through a transmission coil having a multilayer structure in which a plurality of coil layers of different sizes are stacked; and
    a power transmitter configured to wirelessly transmit, to a reception coil of the power receiver, in response to the detection of the power receiver within the predetermined separation distance from the charging pad, a power signal generated using magnetic fields generated by the plurality of coil layers,
    wherein the plurality of coil layers comprise:
        a first coil layer having a first diameter based on a maximum area of the charging pad, a first side of the first coil layer being configured to face the reception coil; and
        a second coil layer having a second diameter less than the first diameter, the second coil layer being disposed on a second side of the first coil layer, opposite the first side of the first coil layer, to overlap the first coil layer such that the first coil layer and the second coil layer are concentric.

2. The wireless power transmitting device of claim 1, wherein the plurality of coil layers are stacked in a tapered form, and
    wherein the power transmitter is configured to generate the power signal using a magnetic field generated by the first coil layer and a magnetic field generated by the second coil layer, in an area where the first coil layer and the second coil layer overlap.

3. The wireless power transmitting device of claim 2, wherein the power transmitter is further configured to generate the power signal using the magnetic field generated by the first coil layer, in an area where the first coil layer and the second coil layer do not overlap.

4. The wireless power transmitting device of claim 2, wherein the plurality of coil layers further comprise:
    a third coil layer having a third diameter less than the second diameter, the third coil layer being disposed on one side of the second coil layer to overlap the second coil layer such that the first coil layer, the second coil layer, and the third coil layer are concentric,
    wherein the power transmitter is further configured to generate the power signal using the magnetic field generated by the first coil layer, the magnetic field generated by the second coil layer, and a magnetic field generated by the third coil layer, in an area where the first coil layer, the second coil layer, and the third coil layer overlap.

5. The wireless power transmitting device of claim 4, wherein the controller is further configured to additionally generate a magnetic field through the third coil layer, in addition to the first coil layer and the second coil layer, in response to an intensity of the magnetic field of the transmission coil in a central area of the first coil layer and the second coil layer being less than or equal to a threshold.

6. The wireless power transmitting device of claim 2, wherein the first diameter is greater than or equal to a diameter of the reception coil, and
    wherein a secondary coil forming the second coil layer is connected in series to a primary coil forming the first coil layer.

7. The wireless power transmitting device of claim 1, wherein each coil layer among the plurality of coil layers includes a plurality of coil turns, and
    diameters of the plurality of coil turns of each coil layer are equal or decrease in proportion to the number of windings.

8. The wireless power transmitting device of claim 1, wherein the transmission coil comprises at least one magnetic substance disposed at a core of the plurality of coil layers, and
    wherein the power transmitter is further configured to generate the power signal using a magnetic field that changes by the magnetic substance.

9. The wireless power transmitting device of claim 1, wherein the controller is further configured to apply, to the transmission coil, a single inverter voltage corresponding to power required by the power receiver, and generate a magnetic field within a predetermined intensity range at a feeder cable included in the transmission coil using the single inverter voltage.

10. The wireless power transmitting device of claim 1, wherein the controller is further configured to generate the magnetic field when the reception coil and the transmission coil are in parallel while maintaining the predetermined separation distance for a predetermined time.

11. The wireless power transmitting device of claim 1, wherein the controller is further configured to additionally generate a magnetic field through an additional coil layer or a magnetic substance disposed at a core of the plurality of coil layers in response to verification that a charging efficiency or a rectified voltage is less than or equal to a predetermined reference value, from data obtained from the power receiver after the transmission of the power signal.

12. A wireless power transmitting method, comprising:
   in response to detection of a power receiver within a predetermined separation distance from a charging pad,
   generating a magnetic field through a transmission coil with a multilayer structure in which a plurality of coil layers of different sizes are stacked; and
   wirelessly transmitting, to a reception coil of the power receiver, a power signal generated using magnetic fields generated by the plurality of coil layers,
   wherein the plurality of coil layers comprise:
      a first coil layer having a first diameter based on a maximum area of the charging pad, a first side of the first coil layer being configured to face the reception coil; and
      a second coil layer having a second diameter less than the first diameter, the second coil layer being disposed on a second side of the first coil layer, opposite the first side of the first coil layer, to overlap the first coil layer such that the first coil layer and the second coil layer are concentric.

13. The wireless power transmitting method of claim 12, wherein the plurality of coil layers are stacked in a tapered form, and
   wherein the wirelessly transmitting comprises generating the power signal using a magnetic field generated by the first coil layer and a magnetic field generated by the second coil layer, in an area where the first coil layer and the second coil layer overlap.

14. The wireless power transmitting method of claim 13, wherein the wirelessly transmitting further comprises generating the power signal using the magnetic field generated by the first coil layer, in an area where the first coil layer and the second coil layer do not overlap.

15. The wireless power transmitting method of claim 13, wherein the plurality of coil layers further comprise:
   a third coil layer having a third diameter less than the second diameter, the third coil layer being disposed on one side of the second coil layer to overlap the second coil layer such that the first coil layer, the second coil layer, and the third coil layer are concentric,
   wherein the wirelessly transmitting further comprises generating the power signal using the magnetic field generated by the first coil layer, the magnetic field generated by the second coil layer, and a magnetic field generated by the third coil layer, in an area where the first coil layer, the second coil layer, and the third coil layer overlap.

16. The wireless power transmitting method of claim 12, wherein the transmission coil comprises at least one magnetic substance disposed at a core of the plurality of coil layers, and
   wherein the wireless power transmitting method further comprises generating the power signal using a magnetic field that changes by the magnetic substance.

17. The wireless power transmitting method of claim 12, wherein the generating further comprises applying, to the transmission coil, a single inverter voltage corresponding to power required by the power receiver, and generating a magnetic field within a predetermined intensity range at a feeder cable included in the transmission coil using the single inverter voltage.

* * * * *